US012654657B2

(12) United States Patent
Fukui

(10) Patent No.: US 12,654,657 B2
(45) Date of Patent: Jun. 16, 2026

(54) VEHICLE TRAVELLING CONTROL DEVICE AND METHOD

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 18/818,902

(22) Filed: Aug. 29, 2024

(65) Prior Publication Data

US 2025/0178574 A1 Jun. 5, 2025

(30) Foreign Application Priority Data

Dec. 5, 2023 (JP) ................................. 2023-205303

(51) Int. Cl.
B60T 7/12 (2006.01)
B60W 30/09 (2012.01)
B60W 30/12 (2020.01)

(52) U.S. Cl.
CPC ............... B60T 7/12 (2013.01); B60W 30/09 (2013.01); B60W 30/12 (2013.01); B60T 2201/083 (2013.01); B60T 2220/02 (2013.01)

(58) Field of Classification Search
CPC ................. B60T 7/12; B60T 2201/083; B60T 2201/086; B60T 2220/02; B60W 30/09; B60W 30/12
USPC .......................................................... 701/70
See application file for complete search history.

(56) References Cited

U.S. PATENT DOCUMENTS

| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2012/0212353 | A1* | 8/2012 | Fung ...................... G08G 1/167 |
| | | | 701/1 |
| 2012/0288154 | A1 | 11/2012 | Shima et al. |
| 2018/0105171 | A1 | 4/2018 | Tsuji et al. |
| 2021/0061309 | A1 | 3/2021 | Kawanai |
| 2021/0107521 | A1 | 4/2021 | Fujita et al. |

(Continued)

FOREIGN PATENT DOCUMENTS

| JP | 2009-116693 A | 5/2009 |
| JP | 2011-138244 A | 7/2011 |

(Continued)

*Primary Examiner* — Erick R Solis
(74) *Attorney, Agent, or Firm* — SoraIP, Inc.

(57) ABSTRACT

A vehicle traveling control device includes a sensor for detecting a steering operation, an object information acquisition device for acquiring object information around a vehicle, an automatic braking device for automatically braking the vehicle, and a driving support ECU for controlling the automatic braking device, in which the driving support ECU activates the automatic braking device to perform automatic braking for automatically braking the vehicle in a case where it is determined based on the object information acquired by the object information acquisition device that there is a risk of off-road departure of the vehicle and also it is determined based on the steering operation detected by a sensor that a steering operation has been performed in a direction of the off-road departure of the vehicle.

5 Claims, 5 Drawing Sheets

(56)          References Cited

U.S. PATENT DOCUMENTS

| 2021/0107528 | A1  | 4/2021 | Fujita et al. | |
| 2021/0146956 | A1  | 5/2021 | Fujita et al. | |
| 2021/0146958 | A1  | 5/2021 | Tanaka et al. | |
| 2022/0063722 | A1  | 3/2022 | Omikawa et al. | |
| 2022/0281456 | A1* | 9/2022 | Giovanardi | G08G 1/0112 |
| 2023/0278549 | A1* | 9/2023 | Onitsuka | B60W 10/06 |
|  |  |  |  | 701/36 |
| 2025/0214572 | A1* | 7/2025 | Okamoto | B60W 50/14 |
| 2025/0289463 | A1* | 9/2025 | Yoshikawa | B60W 30/16 |

FOREIGN PATENT DOCUMENTS

| JP | 2018-062296 A | 4/2018 |
| JP | 2022-039311 A | 3/2022 |

* cited by examiner

VEHICLE TRAVELLING CONTROL DEVICE AND METHOD

CROSS-REFERENCE TO RELATED APPLICATION

This application claims priority to Japanese Patent Application No. 2023-205303 filed on Dec. 5, 2023, incorporated herein by reference in its entirety.

BACKGROUND

1. Technical Field

The present disclosure relates to a vehicle traveling control device and a method for a vehicle such as an automobile, and more particularly to a vehicle traveling control device and a method for restraining a vehicle from departing off a road.

2. Description of Related Art

A lane departure restraining device is known as a traveling control device for a vehicle such as an automobile. According to the lane departure restraining device, when there is a risk of lane departure of a vehicle, the lane departure of the vehicle is restrained with automatic braking or warning, but when a steering operation is performed by a driver, neither automatic braking nor warning is performed.

For example, Japanese Unexamined Patent Application Publication No. 2009-116693 described below describes a technique for changing a condition for canceling warning according to a driver's alertness level when the driver performs a steering operation in a situation where there is a risk that a vehicle may depart from its lane.

According to this type of lane departure restraining device, when the driver actively tries to cause the vehicle to depart from a lane by performing a steering operation even in a situation where there is a risk that the vehicle may depart from the lane, it is possible to prevent automatic braking and warning from being performed unnecessarily.

SUMMARY

Even when a driver performs a steering operation in a situation where there is a risk that a vehicle may depart from the lane, it does not necessarily mean that the driver is actively trying to cause the vehicle to depart from the lane. When the driver is not actively trying to cause the vehicle to depart from the lane, automatic braking and warning may not be canceled even when the driver performs a steering operation.

Especially when there is a risk that the vehicle may depart off a road, by determining whether the direction of the steering operation by the driver is a direction based on a steering operation of causing the vehicle to depart from the road, it is possible to determine whether the driver is actively trying to cause the vehicle to depart from the lane.

The present disclosure provides vehicle traveling control device and method that are improved such that even when a driver performs a steering operation in a situation where there is a risk that a vehicle may depart off a road, the risk of the departure can be reduced if the steering operation is not a steering operation of actively causing the vehicle to depart from a lane.

According to the present disclosure, there is provided a vehicle traveling control device (100) comprising a steering operation detection device (driving operation sensor 60) that detects a driver's steering operation, an object information acquisition device (15) that acquires information on an object around a vehicle (102), an automatic braking device (36) that automatically brakes the vehicle, and a control unit (driving support ECU 10) that controls the automatic braking device.

The control unit (driving support ECU 10) is configured to activate the automatic braking device to perform automatic braking for automatically braking the vehicle (S140, S170) in a case where it is determined based on the information on the object acquired by the object information acquisition device that there is a risk that the vehicle may depart off a road (S20) and also determining, based on the steering operation detected by the steering operation detection device, that a steering operation in a direction in which the vehicle departs off the road is performed (S30).

Furthermore, according to the present disclosure, there is provided a vehicle traveling control method comprising acquiring information on an object around a vehicle (102) and determining, based on the acquired information on the object, a risk of departure that the vehicle may depart off a road (S20), and activating an automatic braking device to perform automatic braking of automatically braking the vehicle (S140, S170) when it is determined that there is a risk of departure (S110).

The vehicle traveling control method further detects a driver's steering operation, performs no automatic braking (S60) when it is determined that the steering operation has been performed in a direction other than a direction in which the vehicle departs off a road (S30) even in a case where it is determined that there is a risk of departure (S20), and performs automatic braking (S70, S140, S170) when it is determined that there is a risk of departure (S20) and it is also determined that the steering operation has been performed in the direction in which the vehicle departs off the road (S30).

According to the above-described vehicle traveling control device and method, the information on the object around the vehicle is acquired, and the risk of departure of the vehicle off the road is determined based on the acquired information on the object. Furthermore, automatic braking is performed when it is determined that there is a risk that the vehicle may depart off the road and it is determined that a steering operation in a direction in which the vehicle departs off the road has been performed.

Even in a case where the driver performs a steering operation in a situation where there is a risk that the vehicle may depart off a road, it may be regarded that the steering operation is not a steering operation which is actively tried to control a vehicle traveling direction by the driver when a direction of the steering operation is a direction in which the vehicle is caused to depart off the road. According to the above-described vehicle traveling control device and method, automatic braking is performed in this case, so that the risk that the vehicle departs off the road can be reduced as compared with a case where automatic braking is not performed regardless of a steering direction when a steering operation is performed like a conventional vehicle traveling control device.

Note that the risk of the departure of the vehicle off the road is reduced by automatically braking the vehicle, and an automatic steering operation which counters a driver's steering operation, that is, automatic steering of a steering wheel is not performed. Therefore, even when there occurs a situation in which a direction of departure of the vehicle off the road and/or a direction of the steering operation is not properly determined, an inadequate automatic steering operation caused by the above situation is not performed, so that the traveling direction of the vehicle is not inappropriately controlled.

Aspect of Disclosure

According to an aspect of the present disclosure, the control unit (driving support ECU 10) is configured to perform automatic braking (S70, S140, S170) in a case where it is determined that the risk of departure is equal to or more than a first departure reference value (S120), and also it is determined that a related value of the steering operation is equal to or more than a first steering reference value (S10).

According to the above aspect, automatic braking is performed when it is determined that the risk of departure is equal to or more than the first departure reference value and also it is determined that the related value of the steering operation is equal to or more than the first steering reference value. Therefore, no automatic braking is performed when it is determined that the related value of the steering operation is less than the first steering reference value regardless of determination of the risk of departure being more than the first departure reference value, so that it can be avoided to perform automatic braking unnecessarily.

Note that the related value of the steering operation is an index value for determining whether a steering operation has been performed by the driver, and it may be a steering torque, a steering angle, or the like.

According to another aspect of the present disclosure, the vehicle traveling control device (100) further comprises a driving state information acquisition device (monitor camera 16) that acquires information on a driving state of the driver, wherein the control unit (driving support ECU 10) is configured to determine, based on the driving state information acquired by the driving state information acquisition device, whether the driver's driving state is a distracted driving state (S2), when determining that the driver's driving state is not a distracted driving state, the control unit performing automatic braking (S70, S140, S170) in a case where it is determined that the risk of departure is equal to or more than the first departure reference value (S120) and also it is determined that the related value of the steering operation is equal to or more than the first steering reference value (S4, S10), and when determining that the driver's driving state is a distracted driving state, the control unit performing automatic braking in a case where it is determined that the risk of departure is equal to or more than the first departure reference value (S120) and also it is determined that the related value of the steering operation is equal to or more than a second steering reference value smaller than the first steering reference value (S6, S10).

In general, when the driver is in a distracted driving state, the related value of the steering operation is smaller than that when the driver is in an alert state. Therefore, when the driving state of the driver is the distracted driving state, a reference value for determining, based on the related value of the steering operation, whether a steering operation has been performed by a driver may be smaller than that when the driver is in an alert state.

According to the above aspect, in a case where it is determined that the driver's driving state is not a distracted driving state, automatic braking is performed when it is determined that the risk of departure is equal to or more than the first departure reference value and also it is determined that the related value of the steering operation is equal to or more than the first steering reference value. On the other hand, in a case where it is determined that the driver's driving state is a distracted driving state, automatic braking is performed when it is determined that the risk of departure is equal to or more than the first departure reference value and also it is determined that the related value of the steering operation is equal to or more than the second steering reference value smaller than the first steering reference value.

Therefore, as compared with a case where the steering reference value is constant regardless of whether the driver is in a distracted driving state, it is possible to appropriately determine, based on the related value of the steering operation, whether the steering operation has been performed by the driver even in a situation where the driver's driving state is a distracted driving state.

Furthermore, in another aspect of the present disclosure, when performing automatic braking, the control unit (driving support ECU 10) is configured to perform automatic braking at a first deceleration (S140) when it is determined that the risk of departure is less than a second departure reference value larger than the first departure reference value (S120, S130), and perform automatic braking at a second deceleration higher than the first deceleration (S170) when it is determined that the risk of departure is equal to or more than the second departure reference value (S120, S130).

In general, in order to reduce the risk of off-road departure of the vehicle by automatic braking, the deceleration of the vehicle by automatic braking may be higher as the risk of off-road departure of the vehicle is higher.

According to the above aspect, when it is determined that the risk of departure is less than the second departure reference value larger than the first departure reference value, automatic braking is performed at the first deceleration, and when it is determined that the risk of departure is equal to or more than the second departure reference value, automatic braking is performed at the second deceleration higher than the first deceleration. Therefore, as compared with a case where the deceleration of the vehicle by automatic braking is constant regardless of the degree of the risk of departure, it is possible to appropriately control the deceleration of the vehicle by automatic braking.

In the present application, "off-road" means the side of a non-traveling area with respect to the boundary between a traveling area where vehicles can travel and a non-traveling area where vehicles cannot travel. "Off-road departure" means that a reference position preset for vehicles shifts from the traveling area to the non-traveling area. Lanes on which vehicles travel, roadside strips on which vehicles are allowed to travel, evacuation lanes, etc. may be regarded as traveling areas. On the other hand, areas outside roads, roadside strips on which vehicles are not allowed to travel, etc. may be regarded as non-traveling areas.

In the above description, in order to facilitate understanding of the present disclosure, with respect to configurations of the disclosure corresponding to embodiments described below, names and/or signs to be used in the embodiments are appended in parentheses for the configurations. However, components of the present disclosure are not respectively limited to components of the embodiments corresponding to the names and/or signs appended in parentheses. Other objects, other features, and attendant advantages of the present disclosure will be readily understood from the description of the embodiments of the present disclosure which will be made below with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle traveling control device and a vehicle traveling control method according to embodiments of the present disclosure will be described in detail below with reference to the accompanying drawings.

Figure 1:
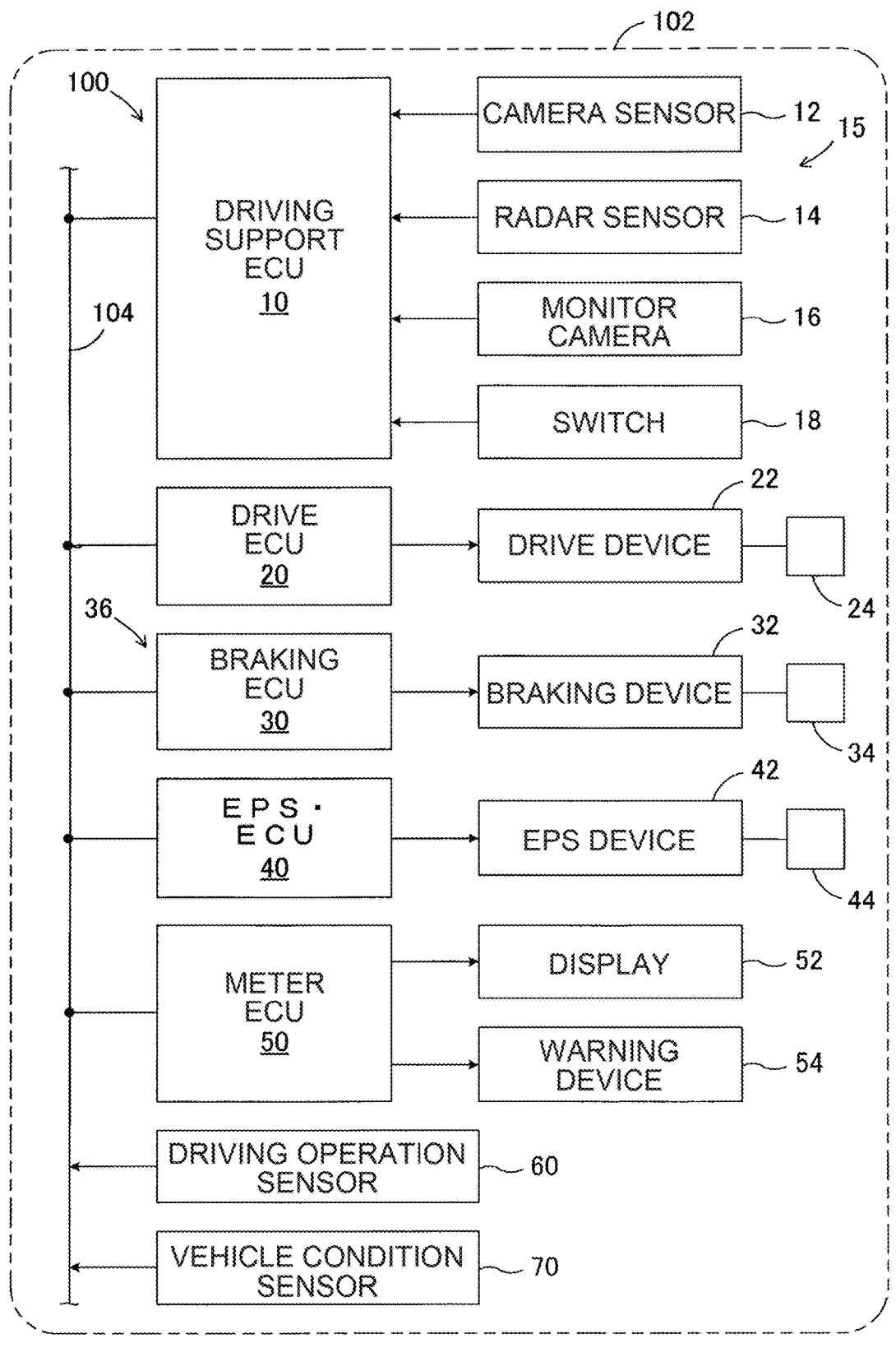
FIG. 1 is a schematic configuration diagram showing an embodiment of a vehicle traveling control device according to the present disclosure.

As shown in FIG. 1, a traveling control device 100 according to an embodiment of the present disclosure is applied to a vehicle 102 and includes a driving support ECU 10. The vehicle 102 is a vehicle capable of performing autonomous driving, and includes a drive ECU 20, a braking ECU 30, an electric power steering ECU 40, and a meter ECU 50. ECU means an electronic control unit that includes a microcomputer as a main part. Note that in the following description, electric power steering is referred to as EPS.

The microcomputer of each ECU includes CPU, ROM, RAM, a readable/writable nonvolatile memory (N/M), an interface (I/F), and the like. The CPU implements various functions by executing instructions (programs, routines) stored in the ROM. Furthermore, these ECUs are connected to one another via a controller area network (CAN) 104 such that they can perform data exchange (communication) among them. Therefore, detection values of sensors (including switches) connected to a specific ECU are also transmitted to other ECUs.

The driving support ECU 10 is a central control device that performs traveling control for driving support such as lane departure restraining control and inter-vehicle distance control. In the embodiment, the driving support ECU 10 executes the lane departure restraining control in cooperation with other ECUs as described in detail later. The traveling control of the embodiment is executed as a part of the lane departure restraining control.

A camera sensor 12, a radar sensor 14, a monitor camera 16, and a switch 18 are connected to the driving support ECU 10. The camera sensor 12 and the radar sensor 14 each include a plurality of camera devices and a plurality of radar devices. The camera sensor 12 and the radar sensor 14 function as an object information acquisition device 15 that acquires object information around the vehicle 102.

Although not shown in the figures, each camera device of the camera sensor 12 includes a camera unit for imaging the surroundings of the vehicle 102, and a recognizer for analyzing image data obtained through the imaging of the camera unit to recognize white lines on roads and objects such as other vehicles. The recognizer supplies information regarding recognized objects to the driving support ECU 10 at predetermined time intervals.

Each radar device of the radar sensor 14 includes a radar transceiver and a signal processor (not shown). The radar transceiver emits radio waves in the millimeter wave band (hereinafter referred to as "millimeter waves"), and receives millimeter waves (that is, reflected waves) reflected by three-dimensional objects (for example, other vehicles, bicycles, etc.) existing in a radiation range. Based on the phase difference between the transmitted millimeter waves and the received reflected waves, the attenuation level of the reflected waves, and the period of time from transmission of the millimeter waves to reception of the reflected waves, and the like, the signal processor supplies information representing the distances between the own vehicle and three-dimensional objects, the relative speeds between the own vehicle and the three-dimensional objects, the relative positions (directions) of the three-dimensional objects with respect to the own vehicle, etc. to the driving support ECU 10 at predetermined time intervals. Note that light detection and ranging (LiDAR) may be used instead of or in addition to the radar sensor 14.

The monitor camera 16 is installed on a dashboard or steering column, and includes a camera unit for imaging the driver's face, and an image processor for processing image data of the driver's face obtained through the imaging of the camera unit. The image processor supplies information on the image data of the driver's face to the driving support ECU 10 at predetermined time intervals. Therefore, the monitor camera 16 functions as a driver monitor camera.

The CPU of the driving support ECU 10 determines a driver's unalertness level based on a driver's eye closing rate per minute, an eye opening status, an eye blinking frequency, an eye movement, etc. based on the information of the image data of the driver's face. The unalertness level is a level indicating a driver's state in which the driver is distracted and unsuitable for driving due to lack of sleep or the like. The method for determining the unalertness level is not particularly limited, and any method known in the art may be adopted. Furthermore, when the unalertness level is determined, at least one of the driver's grip pressure on a steering wheel, press force on an armrest, a heart rate, myoelectric information, and a brain wave pattern may be taken into consideration.

The switch 18 is provided at a position where it can be operated by the driver like a steering wheel (not shown in FIG. 1), and is configured to be operated by the driver. The driving support ECU 10 executes the lane departure restraining control when the switch 18 is set to ON as described in detail later.

A drive device 22 for accelerating the vehicle 102 by applying driving force to drive wheels 24 is connected to the drive ECU 20. The drive ECU 20 normally controls the drive device 22 such that the driving force generated by the drive device 22 changes according to the driving operation by the driver, and upon reception of a command signal from the driving support ECU 10, the drive ECU 20 controls the drive device 22 based on the command signal.

A braking device 32 for applying braking force to wheels 34 to decelerate the vehicle 102 by braking is connected to the braking ECU 30. The braking ECU 30 normally controls the braking device such that the braking force generated by the braking device 32 changes according to the braking operation by the driver, and upon reception of a command signal from the driving support ECU 10, the braking ECU 30 controls the braking device 32 based on the command signal, thereby performing automatic braking.

Therefore, the braking ECU 30 and the braking device 32 cooperate with each other to function together as an automatic braking device 36. Note that when braking force is applied to the wheels by the lane departure restraining control or the like, a braking lamp (not shown in FIG. 1) is turned on.

An EPS device 42 is connected to the EPS ECU 40. The EPS ECU 40 controls a steering assist torque to reduce a steering burden on a driver by controlling the EPS device 42 in a manner known in the art based on a steering torque Ts and a vehicle speed V detected by a driving operation sensor 60 and a vehicle condition sensor 70 described later. Furthermore, the EPS ECU 40 can turn a steering wheel 44 as necessary by controlling the EPS device 42. Therefore, the EPS ECU 40 and the EPS device 42 function as an automatic steering device for automatically steering the steering wheel, as necessary.

A touch panel type display 52 for displaying a control status, etc. by the driving support ECU 10, and a warning device 54 for issuing an alarm are connected to the meter ECU 50. The display 52 may be, for example, a multi-information display on which meters and various kinds of information are displayed, or may be a display of a navigation device. The display 52 may display the status of lane departure restraining control when receiving a signal from the driving support ECU 10.

The warning device 54 is activated when it is determined that there is a risk that the vehicle 102 may depart off the road, and issues an alarm as one of the lane departure restraining control, that is, issues an alarm indicating that there is a risk that the vehicle 102 may depart off the road. The warning device 54 may be any of a warning device for emitting a visual alarm such as an alarm lamp, a warning device for emitting an audible alarm such as an alarm buzzer, and a warning device for emitting a bodily sensitive alarm such as a vibration of a seat, or it may be any combination of these devices.

The driving operation sensor 60 and the vehicle condition sensor 70 are also connected to the CAN 104. Information detected by the driving operation sensor 60 and the vehicle condition sensor 70 (referred to as sensor information) is transmitted to the CAN 104. The sensor information transmitted to the CAN 104 can be used in each ECU as appropriate. Note that the sensor information is information on a sensor connected to a specific ECU, and may be transmitted from the specific ECU to the CAN 104.

The driving operation sensor 60 includes a drive operation amount sensor for detecting an operation amount of an accelerator pedal, a braking operation amount sensor for detecting master cylinder pressure or depression force on a brake pedal, and a brake switch for detecting whether the brake pedal is operated. Furthermore, the driving operation sensor 60 includes a steering angle sensor for detecting a steering angle θ, a steering torque sensor for detecting a steering torque Ts, a turn signal switch for indicating whether a turn signal lever is operated, and a direction of the operation, and the like.

The vehicle condition sensor 70 includes a vehicle speed sensor for detecting the vehicle speed V of the vehicle 102, a front-back acceleration sensor for detecting an acceleration in a front-back direction of the vehicle, a lateral acceleration sensor for detecting an acceleration in a lateral direction of the vehicle, and a yaw rate sensor for detecting a yaw rate of the vehicle, and the like.

First Embodiment

Figure 2:
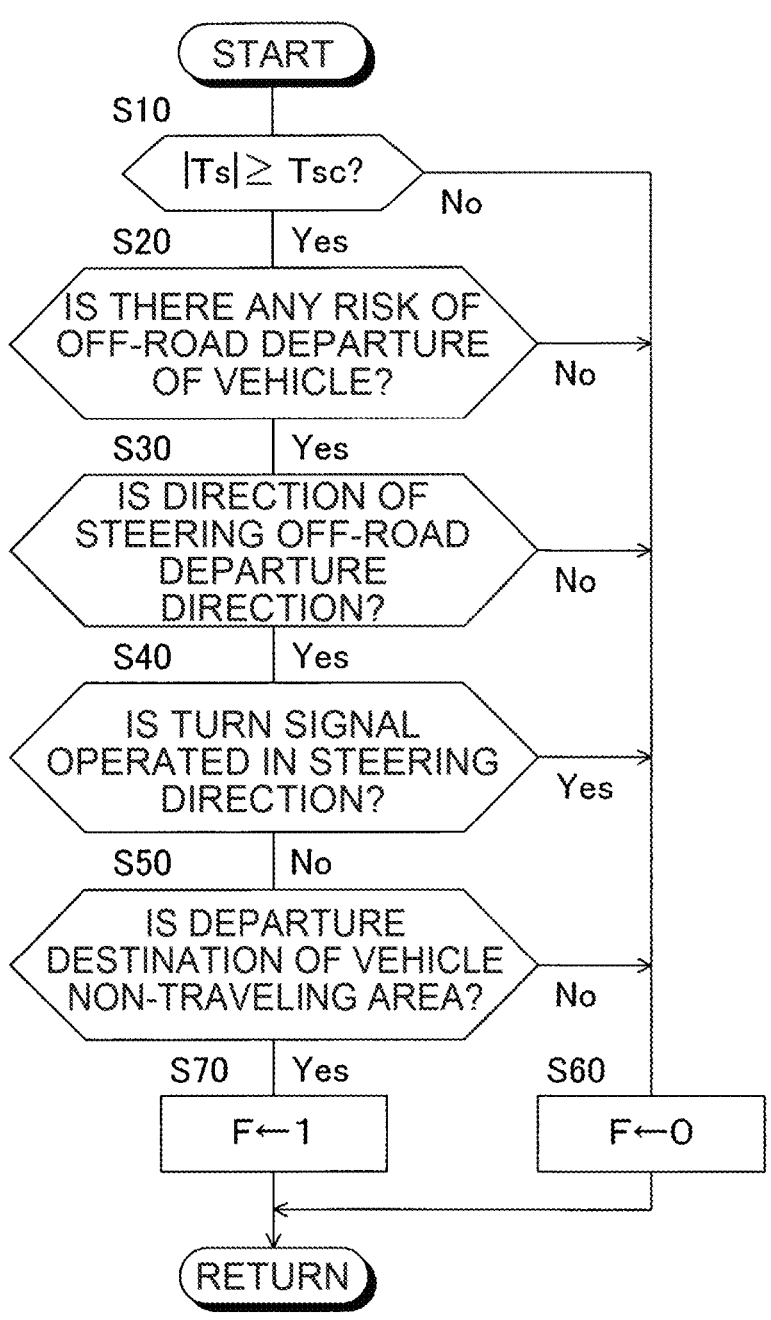
FIG. 2 is a flowchart corresponding to a lane departure and steering determination control program in a first embodiment.

In a first embodiment, ROM of the driving support ECU 10 stores a lane departure and steering determination control program corresponding to a flowchart shown in FIG. 2. Furthermore, in the first embodiment, the ROM of the driving support ECU 10 stores an automatic braking control program for lane departure restraint corresponding to a flowchart shown in FIG. 3. A traveling control method according to the first embodiment is performed by executing the lane departure and steering determination control and the automatic braking control of the lane departure restraint according to the flowcharts shown in FIGS. 2 and 3, respectively.

Lane Departure and Steering Determination Control (FIG. 2)

Next, the lane departure and steering determination control in the first embodiment will be described with reference to the flowchart shown in FIG. 2. The lane departure and steering determination control according to the flowchart shown in FIG. 2 is repeatedly executed at predetermined time intervals by CPU of the driving support ECU 10 in a situation where the switch 18 is set to ON. Note that a flag F is reset to 0 at the start time of the lane departure and steering determination control.

First, in step S10, the CPU determines whether the absolute value of the steering torque Ts is equal to or more than a reference value Tsc, that is, whether the driver is performing a steering operation. If a negative determination is made, the present control proceeds to step S60, and if an affirmative determination is made, the present control proceeds to step S20. Note that the reference value Tsc may be a positive constant, or may be a positive value that is variably set according to the vehicle speed V such that the reference value Tsc is smaller as the vehicle speed V is higher.

In step S20, for example, based on object information around the vehicle 102 acquired by the object information acquisition device 15, the CPU uses a manner known in the art to determine whether there is a risk of lane departure, that is, whether the vehicle 102 is about to depart off the road. If a negative determination is made, the present control proceeds to step S60, and if an affirmative determination is made, the present control proceeds to step S30.

In step S30, for example, based on a steering angle θ detected by the steering angle sensor and the change thereof, the CPU determines whether the direction of the driver's steering operation is a direction determined in step S20 in which the vehicle 102 departs off the road. If a negative determination is made, the present control proceeds to step S60, and if an affirmative determination is made, the present control proceeds to step S40.

In step S40, based on an operation or non-operation of the turn signal lever indicated by the turn signal switch and the direction of the operation, the CPU determines whether the driver has operated the turn signal lever in a direction corresponding to the steering direction determined in step S30. If an affirmative determination is made, the present control proceeds to step S60, and if a negative determination is made, the present control proceeds to step S50.

Figure 3:
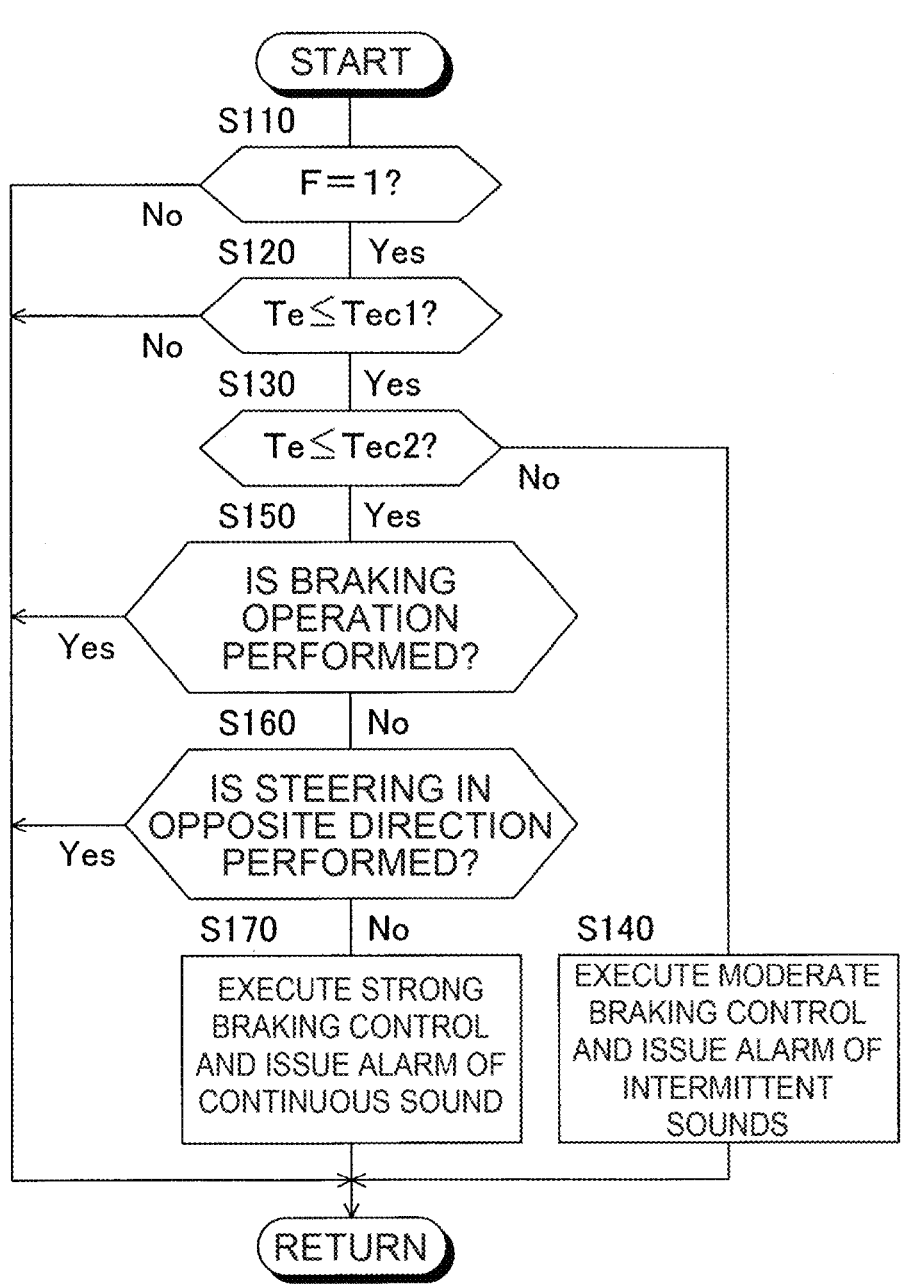
FIG. 3 is a flowchart corresponding to an automatic braking control program for restraining lane departure in the first embodiment.

In step S50, for example, based on the object information around the vehicle 102 acquired by the object information acquisition device 15, the CPU determines whether an area ahead in the direction determined in step S20 in which the vehicle 102 departs off the road is a non-traveling area, that is, an area in which the vehicle cannot travel. If a negative determination is made, the flag F is reset to 0 in step S60, and if an affirmative determination is made, the flag F is set to 1. Note that the fact that the flag F is set to 1 indicates that there is a risk of off-road departure of the vehicle 102, and thus it is necessary to perform control of restraining the departure.
Automatic Braking Control of Lane Departure Restraint (FIG. 3)

Next, the braking force control for lane departure prevention in the first embodiment will be described with reference to the flowchart shown in FIG. 3. The braking force control according to the flowchart shown in FIG. 3 is repeatedly executed by the CPU of the driving support ECU 10 at predetermined time intervals when the switch 18 is set to ON.

First, in step S110, the CPU determines whether the flag F is 1, that is, whether there is a risk that the vehicle 102 may depart off the road and the control of restraining the departure is necessary. If a negative determination is made, this control is once ended, and if an affirmative determination is made, this control proceeds to step S120.

In step S120, for example, based on the object information around the vehicle 102 acquired by the object information acquisition device 15, the CPU calculates a time Te required for the vehicle to depart off the road in a manner known in the art. Furthermore, the CPU determines whether the time Te is equal to or less than a first reference time Tec1 (a positive constant), that is, whether the risk of off-road departure of the vehicle is equal to or more than a first reference value. If a negative determination is made, this control is once terminated, and if an affirmative determination is made, this control proceeds to step S130. Note that the time Te may be calculated, for example, as a time required for a preset reference position of the vehicle to reach the boundary between a road and an off-road area based on the lateral speed of the vehicle 102.

In step S130, the CPU determines whether the time Te is equal to or less than a second reference time Tec2 (a positive constant smaller than Tec1), that is, whether the risk of off-road departure of the vehicle is equal to or more than a second reference value. If an affirmative determination is made, the present control proceeds to step S150, and if a negative determination is made, it is determined that the risk of off-road departure of the vehicle is equal to or more than the first reference value and less than the second reference value, the present control proceeds to step S140.

In step S140, the CPU outputs a command signal to the braking ECU 30 to execute moderate braking control based on automatic braking by the automatic braking device 36 such that the deceleration Gb of the vehicle 102 is equal to a first deceleration Gb1 (a positive constant when a deceleration direction is defined as a positive side). Furthermore, the CPU outputs a command signal to the meter ECU 50, so that an alarm of intermittent sounds is issued by a buzzer device.

In step S150, based on a detection result of the braking operation amount sensor or the state of the brake switch, the CPU determines whether the driver has performed a braking operation. If an affirmative determination is made, the present control is once ended, and if a negative determination is made, the present control proceeds to step S160.

In step S160, based on the steering angle θ detected by the steering angle sensor and the change thereof, the CPU determines whether the driver performs a steering operation in a direction opposite to the direction in which the vehicle 102 departs off the road. If an affirmative determination is made, the present control is once ended, and if a negative determination is made, the present control proceeds to step S170. Note that when no steering operation is performed by the driver, a negative determination is made.

In step S170, the CPU outputs a command signal to the braking ECU 30 to execute strong braking control based on automatic braking by the automatic braking device 36 such that the deceleration Gb of the vehicle 102 is equal to a second deceleration Gb2 (a positive constant larger than Gb1). Furthermore, the CPU outputs a command signal to the meter ECU 50 to issue an alarm of continuous sound with a buzzer device.

Second Embodiment

Figure 4:
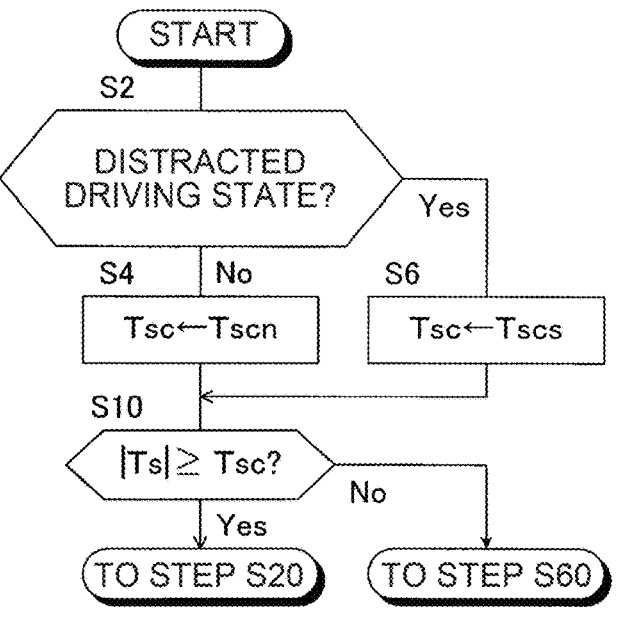
FIG. 4 is a flowchart corresponding to a main part of a lane departure and steering determination control program in a second embodiment.

In a second embodiment, ROM of the driving support ECU 10 stores a lane departure and steering determination control program corresponding to a flowchart whose main part is shown in FIG. 4. Note that an automatic braking control program for lane departure restraint in the second embodiment is the same as the automatic braking control program for the lane departure restraint in the first embodiment. A traveling control method according to the second embodiment is performed by executing the lane departure and steering determination control and the automatic braking control for lane departure restraint according to the flowcharts shown in FIGS. 4 and 3, respectively.
Lane Departure and Steering Determination Control (FIG. 4)

As shown in FIG. 4, steps S2 and S4 or steps S2 and S6 are executed prior to step S10, and steps S10 to S70 are executed in the same manner as in the first embodiment.

Figure 5:
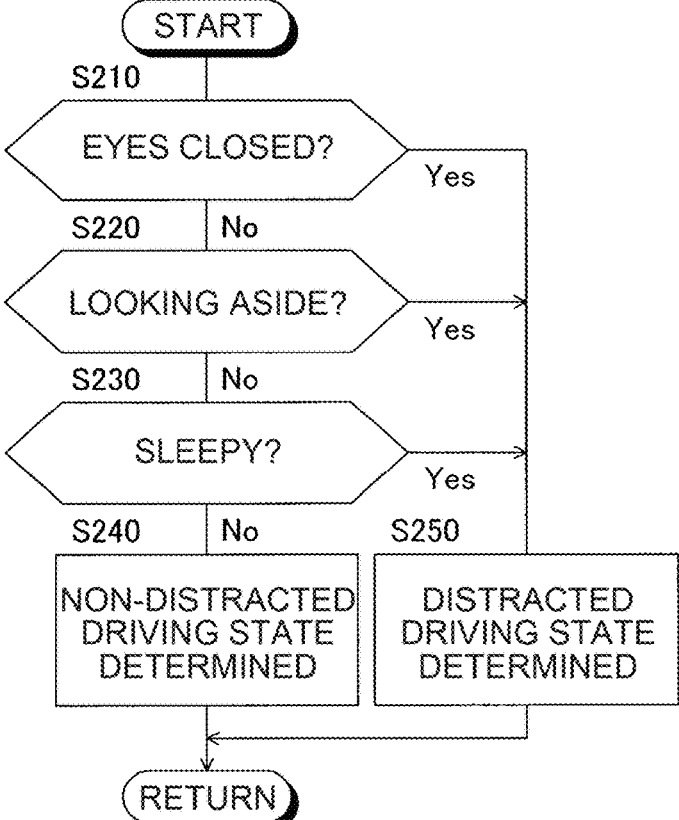
FIG. 5 is a flowchart showing a routine for determining whether a driver is in a distracted driving state.

In step S2, the CPU determines whether the driver is in a distracted driving state. If a negative determination is made, in step S4, the reference value Tsc to be used for the determination in step S10 is set to a standard reference value Tsen. On the other hand, if an affirmative determination is made, in step S6, the reference value Tsc is set to a reference value Tscs under distracted driving which is smaller than the standard reference value Tscn. When step S4 or S6 is completed, the present control proceeds to step S10. Note that the reference values Tsen and Tscs may be positive constants, or may be positive values that are variably set according to the vehicle speed V such that they are smaller as the vehicle speed V is higher.
Determination of Distracted Driving State The determination as to whether the driver is in a distracted driving state may be performed using any manner known in the art based on information on the image data of the driver's face captured by the monitor camera 16. For example, this determination may be made according to a routine corresponding to a flowchart shown in FIG. 5.

In step S210, the CPU determines whether both eyes of the driver are closed. If an affirmative determination is made, the present control proceeds to step S250, and if a negative determination is made, the present control proceeds to step S220.

In step S220, the CPU determines whether the driver is looking aside. If an affirmative determination is made, the present control proceeds to step S250, and if a negative determination is made, the present control proceeds to step S230. Note that when the time and frequency in which the direction of the driver's line of sight is not a forward direction of the vehicle are respectively equal to or more than reference values corresponding thereto, it may be determined that the driver is looking aside.

In step S230, the CPU determines whether the driver is drowsy. If a negative determination is made, it is determined in step S240 that the driver is not in a distracted driving state, and if an affirmative determination is made, it is determined in step S250 that the driver is in a distracted driving state. Note that when the direction of the driver's line of sight is a slightly downward direction with respect to the forward direction, it may be determined that the driver is sleepy if the frequencies of blinking and yawning of the driver are respectively equal to or more than reference values corresponding thereto.

Effects of First and Second Embodiments

As described above, even in a case where the driver performs a steering operation in a situation where there is a risk that the vehicle may depart off the road, when the direction of the steering operation is a direction in which the vehicle is caused to depart off the road, it may be regarded that the steering operation is not any steering operation to be performed to actively control the traveling direction of the vehicle by the driver.

According to the first and second embodiments described above, the automatic braking is performed when the direction of the steering operation is determined, it is determined that there is a risk of off-road departure of the vehicle (S10), and it is determined that a steering operation in a direction of off-road departure of the vehicle is performed (S30). Therefore, as compared with a case where automatic braking is not performed regardless of a steering direction when a steering operation is performed as in a conventional vehicle traveling control device, the risk that the vehicle may depart off the road can be reduced.

Figure 6A:
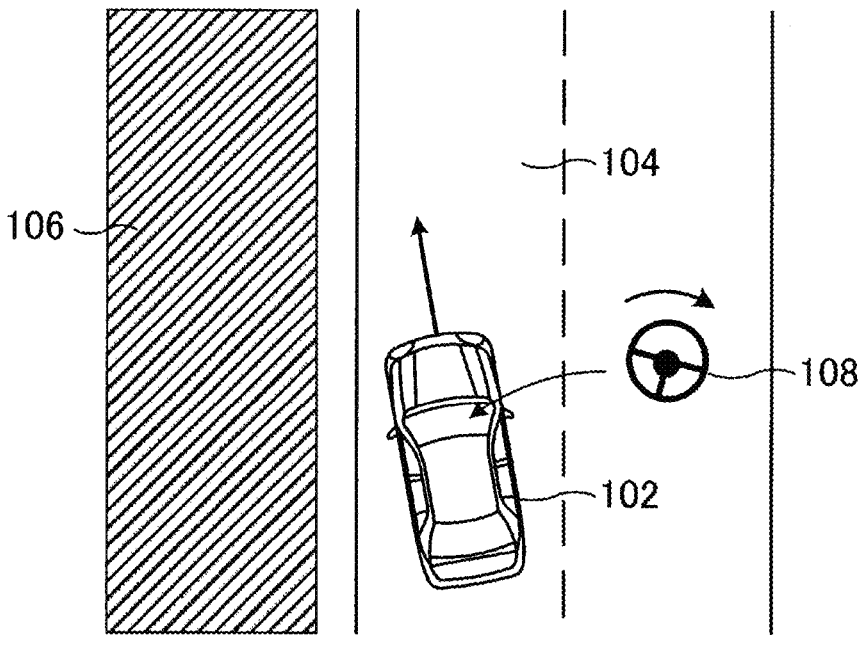
FIG. 6A is a diagram showing a situation where there is a risk that a vehicle may depart from a road of a traveling-possible area to a road of a traveling-impossible area.
Figure 6B:
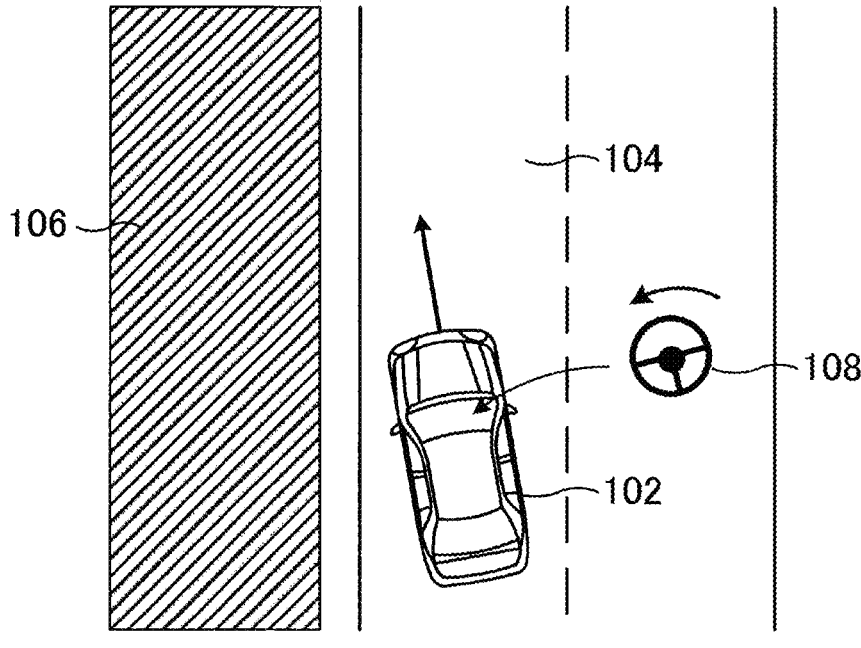
FIG. 6B is a diagram showing a situation where there is a risk that a vehicle may depart from a road of a traveling-possible area to a road of a traveling-impossible area.

For example, FIGS. 6A and 6B show a situation in which there is a risk that the vehicle 102 departs from a traveling-possible road 104 to a traveling-impossible area 106. In particular, FIG. 6A shows a situation in which the driver is operating a steering wheel 108 in a direction away from the traveling-impossible area 106, and FIG. 6B shows a situation in which the driver is operating the steering wheel 108 in a direction approaching the traveling-impossible area 106.

Although an affirmative determination is made in step S20 in the situation shown in FIG. 6A, a negative determination is made in step S30, and the flag F is reset to zero in step S60. Therefore, a negative determination is made in step S110, so that steps S140 and S170 are not executed, and neither automatic braking nor issuance of warning is performed. Accordingly, in a situation where the driver is trying to avoid the vehicle from departing off the road by a steering operation, it is possible to avoid unnecessary automatic braking and issuance of a warning.

On the other hand, in the situation shown in FIG. 6B, affirmative determinations are made in steps S20 and S30, and the flag F is set to 1 in step S70. Therefore, an affirmative determination is made in step S110, so that steps S140 and S170 are executed, and automatic braking and issuance of warning is performed. Therefore, it is possible to draw the driver's attention and slow down the vehicle, whereby it is possible to reduce the risk that the vehicle 102 depart into the traveling-impossible area 106.

The risk of off-road departure of the vehicle 102 is reduced by automatic braking of the vehicle and issuance of warning (S140, S170), and an automatic steering operation countering the driver's steering operation, that is, automatic steering of the steering wheel is not performed. Therefore, even when there occurs a situation in which determination as to the direction of off-road departure of the vehicle and/or the direction of the steering operation is not properly performed, the automatic steering operation is prevented from being performed inappropriately due to this determination, so that the traveling direction of the vehicle is not inappropriately controlled.

Furthermore, according to the first and second embodiments, when it is determined that the risk of departure is equal to or more than the first departure reference value (S120) and the related value of the steering operation is equal to or more than the first steering reference value (S10), automatic braking is performed (S70, S140, S170). Therefore, even in a case where it is determined that the risk of departure is equal to or more than the first departure reference value, automatic braking is not performed when it is determined that the related value of the steering operation is less than the first steering reference value, so that it is possible to avoid unnecessary automatic braking from being performed.

Furthermore, according to the first and second embodiments, when it is determined that the risk of departure is less than the second departure reference value larger than the first departure reference value (S120, S130), automatic braking is performed at the first deceleration Gb1 (S140), and when it is determined that the risk of departure is equal to or more than the second departure reference value (S120, S130), automatic braking is performed at the second deceleration Gb2 higher than the first deceleration (S170). Therefore, as compared with a case where the deceleration of the vehicle by automatic braking is constant regardless of the degree of the risk of departure, the deceleration of the vehicle by automatic braking can be appropriately controlled.

In particular, according to the second embodiment, in a case where it is determined that the driver's driving state is not a distracted driving state (S2), automatic braking is performed (S70, S140, S170) when it is determined that the risk of departure is equal to or more than the first deviation reference value (S120) and it is also determined that the related value of the steering operation is equal to or more than the first steering reference value (S4, S10). On the other hand, in a case where it is determined that the driver's driving state is a distracted driving state (S2), automatic braking is performed when it is determined that the risk of departure is equal to or more than the first departure reference value (S120) and it is also determined that the related value of the steering operation is equal to or more than the second steering reference value smaller than the first steering reference value (S6, S10).

Accordingly, as compared with a case where the steering reference value is constant regardless of whether the driver's driving state is a distracted driving state, whether the steering operation has been performed by the driver can be appropriately determined based on the related value of the steering operation even in a situation where the driver's driving state is a distracted driving state.

Although the present disclosure has been described in detail with respect to the specific embodiments, the present disclosure is not limited to the above-described embodiments, and it is apparent to those skilled in the art that various other embodiments are possible within the scope of the present disclosure.

For example, in the first and second embodiments described above, when it is determined in step S130 that the time Te is equal to or less than the second reference time Tec2, moderate braking control is performed in step S140 such that the deceleration Gb of the vehicle 102 is equal to the first deceleration Gb1. However, steps S130 and S140 may be omitted.

Furthermore, in the first and second embodiments described above, a warning of intermittent sounds is issued in step S140, and a warning of continuous sound is issued in step S170. However, issuance of warning may be omitted.

Furthermore, in the first and second embodiments described above, automatic steering for reducing the risk of off-road departure of the vehicle is not performed in steps S140 and S170. However, at least in step S170, automatic steering for reducing the risk of off-road departure of the vehicle may be performed in addition to automatic braking. Note that when automatic steering is performed in steps S140 and S170, the control amount of the automatic steering in step S170 may be set to be larger than the control amount of the automatic steering in step S140.

What is claimed is:

1. A vehicle traveling control device comprising:
a steering operation detection device that detects a steering operation by a driver;
an object information acquisition device that acquires information on an object around a vehicle;
an automatic braking device that automatically brakes the vehicle; and
a control unit that controls the automatic braking device, wherein the control unit is configured to activate the automatic braking device to perform automatic braking for automatically braking the vehicle in a case where it is determined based on the information on the object acquired by the object information acquisition device that there is a risk that the vehicle may depart off a road and also it is determined based on the steering operation detected by the steering operation detection device that a steering operation in a direction in which the vehicle departs off the road has been performed.

2. The vehicle traveling control device according to claim 1, wherein the control unit is configured to perform the automatic braking in a case where it is determined that the risk of departure is equal to or more than a first departure reference value, and also it is determined that a related value of the steering operation is equal to or more than a first steering reference value.

3. The vehicle traveling control device according to claim 2, further comprising a driving state information acquisition device that acquires information on a driving state of the driver, wherein the control unit is configured to determine, based on the driving state information acquired by the driving state information acquisition device, whether a driver's driving state is a distracted driving state, when determining that the driver's driving state is not a distracted driving state, the control unit performing automatic braking in a case where it is determined that the risk of departure is equal to or more than the first departure reference value and also it is determined that the related value of the steering operation is equal to or more than the first steering reference value, and when determining that the driver's driving state is a distracted driving state, the control unit performing automatic braking in a case where it is determined that the risk of departure is equal to or more than the first departure reference value and also it is determined that the related value of the steering operation is equal to or more than a second steering reference value smaller than the first steering reference value.

4. The vehicle traveling control device according to claim 2, wherein in a case where the automatic braking is performed, the control unit is configured to perform the automatic braking at a first deceleration when determining that the risk of departure is less than a second departure reference value larger than the first departure reference value, and perform the automatic braking at a second deceleration higher than the first deceleration when determining that the risk of departure is equal to or more than the second departure reference value.

5. A vehicle traveling control method comprising:
acquiring information on an object around a vehicle and determining, based on the acquired information on the object, a risk of departure that the vehicle departs off a road; and
activating an automatic braking device to perform automatic braking for automatically braking the vehicle when it is determined that there is a risk of departure, wherein the method detects a driver's steering operation, performs no automatic braking when it is determined that the steering operation has been performed in a direction other than a direction in which the vehicle departs off a road even in a case where it is determined that there is a risk of departure, and performs automatic braking when it is determined that there is a risk of departure and also it is determined that the steering operation has been performed in the direction in which the vehicle departs off the road.

* * * * *